No. 621,285. Patented Mar. 14, 1899.
C. J. REED.
METHOD OF AND MEANS FOR OPERATING ELECTRIC MOTORS.
(Application filed July 29, 1898.)
(No Model.) 4 Sheets—Sheet 1.
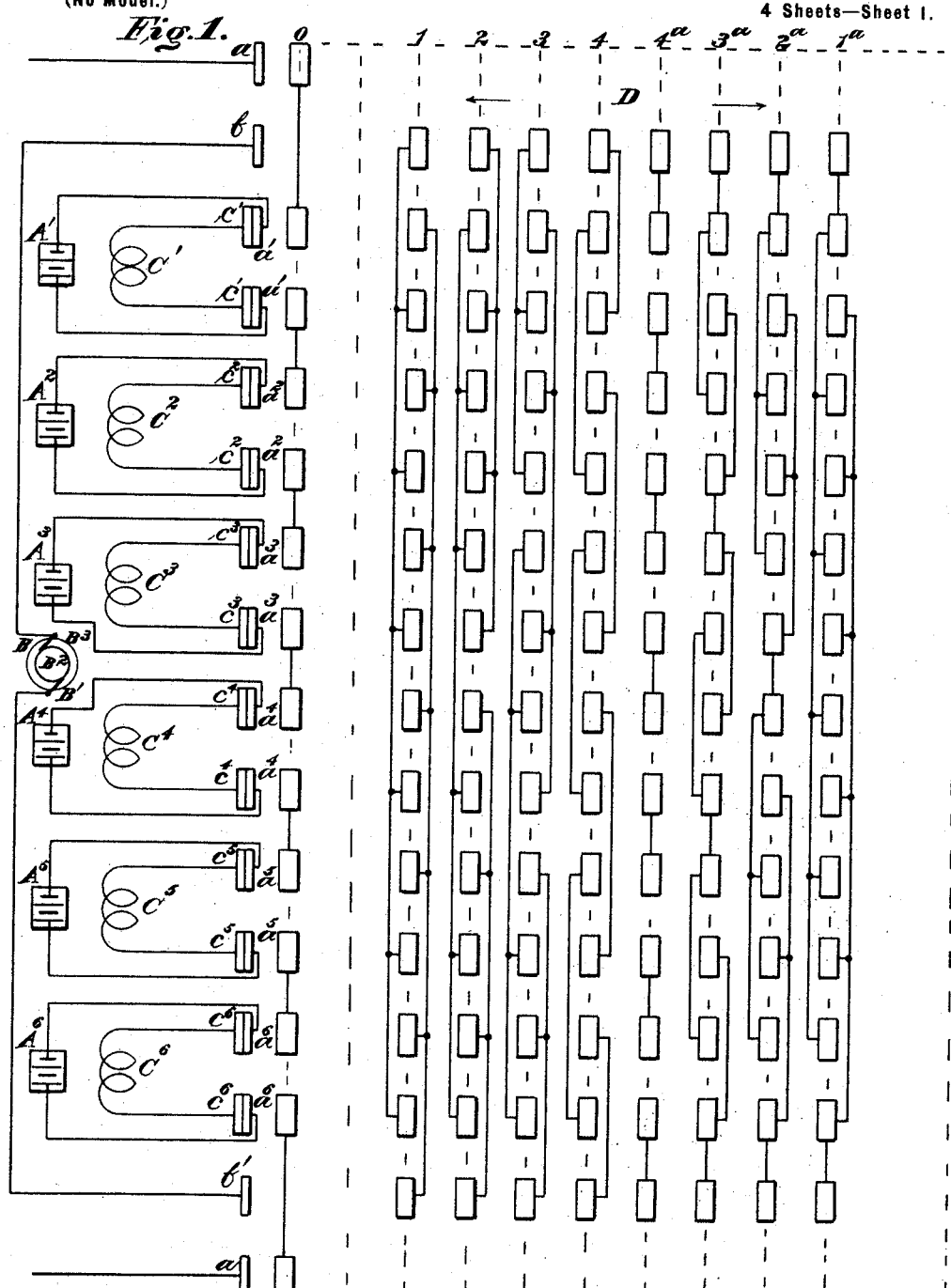
WITNESSES:
INVENTOR
Charles J. Reed
BY
ATTORNEY.

No. 621,285. Patented Mar. 14, 1899.
C. J. REED.
METHOD OF AND MEANS FOR OPERATING ELECTRIC MOTORS.
(Application filed July 29, 1898.)
(No Model.) 4 Sheets—Sheet 2.
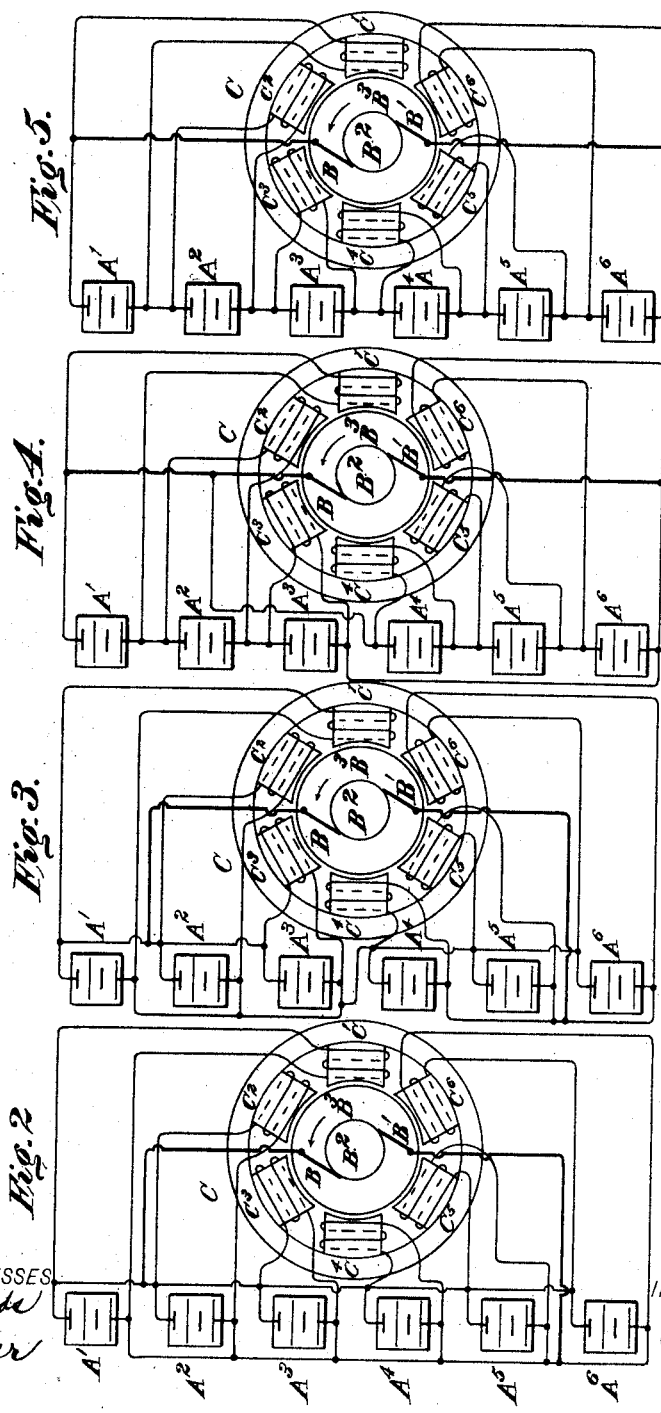

No. 621,285. Patented Mar. 14, 1899.
C. J. REED.
METHOD OF AND MEANS FOR OPERATING ELECTRIC MOTORS.
(Application filed July 29, 1898.)
(No Model.) 4 Sheets—Sheet 3.
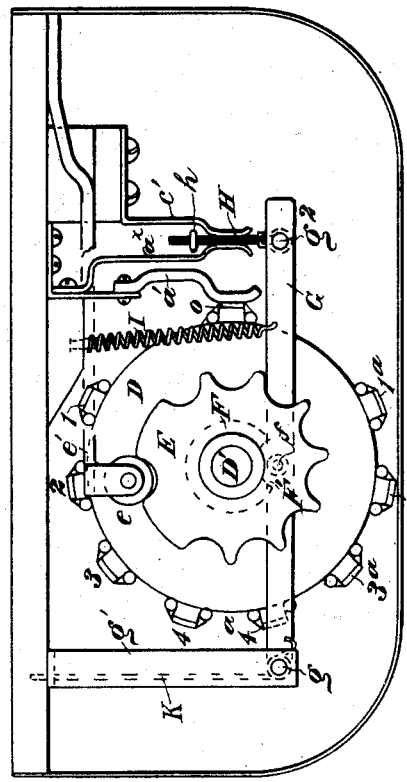
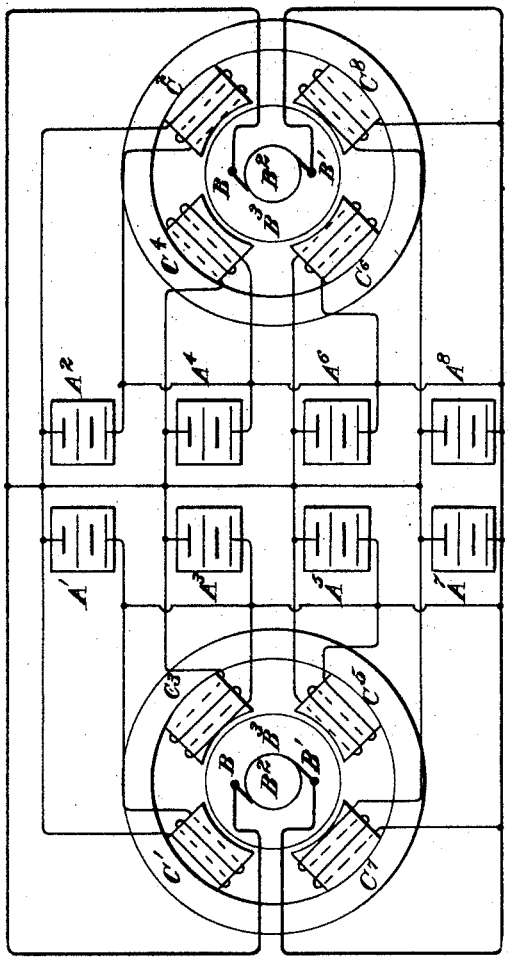
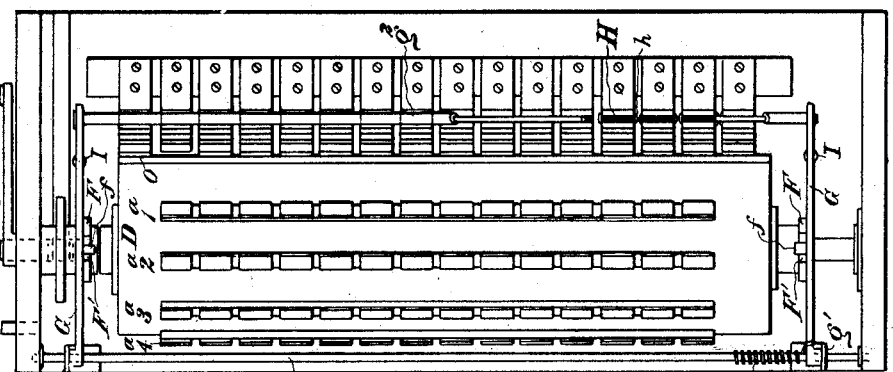
WITNESSES: INVENTOR
Charles J. Reed
BY
Wesley G. Carr
ATTORNEY.
THE NORRIS PETERS CO., PHOTO-LITHO., WASHINGTON, D. C.

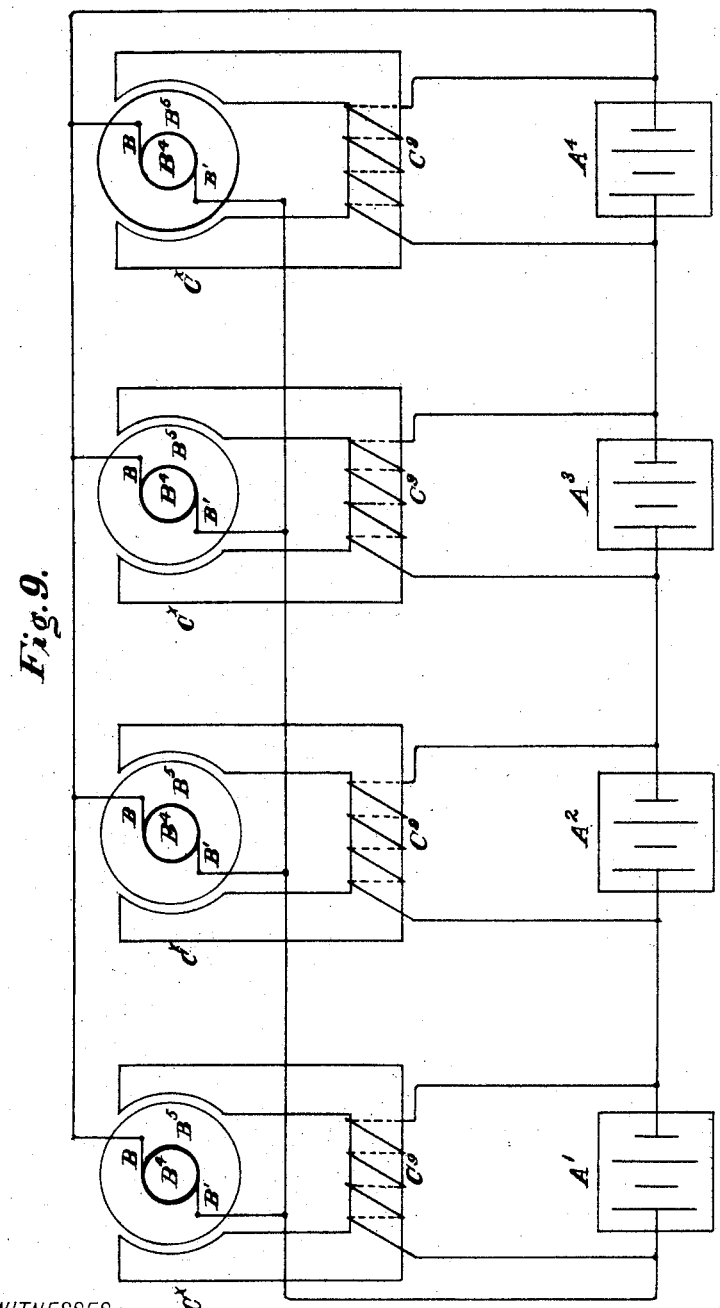

UNITED STATES PATENT OFFICE.

CHARLES JOHN REED, OF PHILADELPHIA, PENNSYLVANIA.

METHOD OF AND MEANS FOR OPERATING ELECTRIC MOTORS.

SPECIFICATION forming part of Letters Patent No. 621,285, dated March 14, 1899.

Application filed July 29, 1898. Serial No. 687,170. (No model.)

*To all whom it may concern:*

Be it known that I, CHARLES JOHN REED, a citizen of the United States, residing in Philadelphia, in the county of Philadelphia and State of Pennsylvania, have invented a new and useful Improvement in Methods of and Means for Operating Electric Motors, of which the following is a specification.

My invention relates to electric motors and the operation of the same at different speeds.

The object of my invention is to provide a method and a means for economically and efficiently operating electric motors at varying speeds from a divided source of electrical energy, by which I mean a source of electrical energy consisting of two or more (generally several) independent units or sources capable of being united together in series or in multiple or in multiple series and separated again at will. A number of secondary batteries of equal capacity and electromotive force, or a number of dynamos of equal capacity and electromotive force, or a number of dynamos and a number of accumulators, all of equal electromotive force and capacity, would constitute such a divided source of electrical energy. The separate units constituting the divided source need not necessarily have equal capacities provided they have equal voltage; but it is usual to have them also of equal capacity.

In the accompanying drawings I have shown a means for practicing my method; but any other suitable means may be employed.

Figure 1 is a diagram of secondary batteries, motor-coils, and a controller, the drum of the latter being developed into a plane. Figs. 2 to 5 represent, diagrammatically, as many different and successive methods of connecting a motor to a divided source of electrical energy. Fig. 6 is a diagram showing a divided source of electrical energy connected to two motors. Fig. 7 is a front elevation, and Fig. 8 a plan view, of one form of controller adapted for use in practicing my invention. Fig. 9 is a diagram illustrating my invention in connection with a plurality of motors each of which has a single field-winding.

In Figs. 1 to 5 of the drawings, $A'$, $A^2$, $A^3$, $A^4$, $A^5$, and $A^6$ represent secondary batteries or other independent units constituting, collectively, a divided source of electrical energy. B and B' represent, respectively, the positive and negative brushes, $B^2$ the commutator-cylinder, and $B^3$ the armature of a direct-current electric motor C, and $C'$, $C^2$, $C^3$, $C^4$, $C^5$, and $C^6$ represent independent field-magnet windings or coils, constituting, collectively, the "field-circuit." The field-windings $C'$, $C^2$, $C^3$, $C^4$, $C^5$, and $C^6$ are respectively connected to the terminals of the divisions $A'$, $A^2$, $A^3$, $A^4$, $A^5$, and $A^6$ of the divided source of electrical energy in such a manner as to produce the desired magnetic fluxes through the field-magnet poles and the armature. I am evidently not limited to the arrangement shown, but may arrange the several coils to produce any other number of magnetic poles either in one or a plurality of motors.

Referring now particularly to Fig. 1, $a\ a$ are the terminals of a line-circuit in the form of contact-fingers, and $b\ b'$ are contact-fingers connected, respectively, with the motor-brushes B and B'. The terminals of the field-coils $C'$ to $C^6$ are respectively connected to fingers $c'$ to $c^6$, and the terminals of the secondary-battery cells $A'$ to $A^6$ are respectively connected to fingers $a'$ to $a^6$. The several fingers $c'$ to $c^6$ are shown as in contact with the fingers $a'$ to $a^6$, and so far as the operation of the motor is concerned either of these sets of fingers would be sufficient. The two sets are useful, however, in order that they may be separated to disconnect the field-coils from the battery-cells when it is desired to charge the latter.

The controller-drum D is shown as provided with nine longitudinally-arranged sets of contact plates or strips. The set marked $o$ has plates in position to respectively engage fingers $a'$ to $a^6$, and each of sets 1 to 4 and $1^a$ to $4^a$ has plates corresponding to fingers $b$ and $b'$ and $a'$ to $a^6$. The plates of each set are electrically connected, as indicated in the drawings.

Referring now to Figs. 7 and 8, the controller drum-shaft D' is shown as provided with the usual disk or plate E, having notches corresponding to the several sets of contact-plates, with which coöperates a roller $e$ on a holding-pawl $e'$. The shaft D' is also provided near each end with a disk or ring F, having a notch F'. Two arms G are pivotally mounted at their rear ends upon a rod $g$, which is supported by two standards $g'$ or by the ends of the controller-frame, or by both. The front ends of arms G are connected by a rod $g^2$, from which depends either a single plate or strip of insulating material or a series of strips H, corresponding in width and position to the several fingers $c'$ to $c^6$.

In Figs. 7 and 8 I have shown supplemental fingers $a^×$, that constitute parts of the fingers $a'$ to $a^6$ both electrically and mechanically and are so arranged that they will be separated from fingers $c'$ to $c^6$ by the strips H when the fingers $a'$ to $a^6$ are in contact with the set of strips marked $o$. Each strip H is provided with a metal band $h$ for making electrical connection between the corresponding fingers when the arms G are moved outward against the action of the springs I and K by the rings F acting against the rollers $f$ on the arms G.

When the controller is in the position indicated in Figs. 7 and 8, the battery-cells are so connected as to be charged in series from any suitable source of electrical energy. If the drum be rotated in a clockwise direction, the field-coils will be first connected with the battery-cells, so as to enable the field to build up before the armature-circuit is closed. When the set of contact-plates 1 comes into engagement with the corresponding fingers $b$ $b'$ and $a'$ to $a^6$ the circuits will be as indicated in Fig. 2—i. e., each field-coil will be connected to the terminals of the corresponding battery-cell or other division of a divided source of electrical energy, and the positive brush B will be electrically connected to the positive terminal of each of the divisions A', A², &c., of the divided source of electrical energy, the negative brush B' being electrically connected to the negative terminal of each of such divisions. This arrangement causes the armature of the motor to move forward, as indicated by the arrow, and at a speed approximately proportional to the electromotive force of one division of the source of electrical energy.

Fig. 3 illustrates the circuits when the fingers are in contact with set 2 of the drum-plates. In this position the field-coils are connected in the same manner as in Fig. 2. The positive brush B is electrically connected to the positive terminal of each of the three divisions $A'$ $A^2$ $A^3$ of the divided source, while the negative terminals of these divisions are all electrically connected to the positive terminals of the divisions $A^4$, $A^5$, and $A^6$, and the negative terminals of divisions $A^4$, $A^5$, and $A^6$ are electrically connected to the negative brush B'. This arrangement causes the armature to move in the same direction as in Fig. 2, but at a speed approximately proportional to the electromotive force of two of the divisions in series—that is, at about twice the speed of the arrangement shown in Fig. 2.

Fig. 4 illustrates the circuits corresponding to the engagement of fingers $b$ and $b'$ and $a'$ to $a^6$ with the set 3 of the drum-plates. In this position the field-coils are connected in the same manner as in Figs. 2 and 3. The positive brush B is electrically connected to the positive terminal of each of the two divisions A' and $A^4$. Division $A^3$ is electrically connected in series with divisions $A^2$ and $A'$, while division $A^4$ is electrically connected in series with divisions $A^5$ and $A^6$. The negative terminals of divisions $A^3$ and $A^6$ are both electrically connected with the negative brush B' of the motor. This arrangement also causes the armature to move forward, as indicated by the arrow, and at a speed approximately proportional to the electromotive force of three of the divisions in series—that is, at about three times the speed of the arrangement shown in Fig. 2.

Fig. 5 illustrates the circuits corresponding to the engagement of the fingers $b$ and $b'$ and $a'$ to $a^6$ with the set 4 of the drum-plates. In this position the field-coils are connected in the same manner as in the preceding figures. The positive brush B is electrically connected to the positive terminal of the division A', the negative brush B' to the negative terminal of the division $A^6$, and all the divisions are electrically connected together in series. This arrangement causes the armature to move forward, as indicated by the arrow, and at a speed approximately proportional to the electromotive force of all the divisions A', $A^2$, $A^3$, $A^4$, $A^5$, and $A^6$ in series—that is, at about six times the speed of the arrangement shown in Fig. 2.

In order to secure a reverse direction of rotation by the means shown in the drawings, the controller-drum is rotated in a contra-clockwise direction to the $o$ position and then in the same direction to positions $1^a$, $2^a$, $3^a$, and $4^a$ successively, the circuits made and rates of speed attained corresponding to those already described, except that the armature-circuit is reversed with reference to the source of electrical energy.

Instead of employing separate sets of contact-plates on the main controller-drum for reversing the motor it will be understood that a separate reversing-switch might be employed, as is usual in controlling apparatus.

It is evident that all the foregoing connections between the armature and the divisions of the source of energy may be made in succession in any desired order without at any time opening or changing the field circuit or circuits and that the number of rates of speed may be increased by increasing the number of divisions in the source of electrical energy and the number of combinations of such divisions.

In Fig. 6 I have shown eight divisions of a source of electrical energy (designated as A' to $A^8$) and two motors, one of which is provided with four field-coils C', $C^3$, $C^5$, and $C^7$, corresponding to the divisions A', A³, A⁵, and A⁷, and the other with four coils C², C⁴, C⁶, and C⁸, corresponding to divisions A², A⁴, A⁶, and A⁸ of the source of electrical energy.

The armatures B³ are shown as connected in parallel and as supplied by the divisions A' to A⁸, connected in parallel; but it will be understood that the armatures may be connected in series or that the two arrangements may be made successively for different rates of speed in a manner well known in the art. It will also be understood that the divisions A' to A⁸ of the source of energy may be variously grouped in multiple, multiple series, and series in the manner already described in order to secure different rates of speed for the motors.

In Fig. 9 I have shown four motors C$^X$, each of which has a single field-winding C⁹. These field-windings are respectively supplied with electrical energy from divisions A', A², A³, and A⁴ of a suitable source, such source being here indicated as a secondary battery, the cells of which are connected together in series. The armatures B⁵ of the motors C$^X$ are shown as connected to the source of energy in multiple through the commutator-cylinders B⁴ and brushes B and B⁸; but it will be understood that they may be connected in series or in series and multiple alternately to secure different speeds, as is well known in the art. It will also be understood that the battery-cells or other divisions of the source of electrical energy may be coupled in multiple and in multiple series, as well as in series, by any suitable means in order to vary the speed of the motor-armatures. The number of divisions A', A², &c., and the number of motors may obviously be different from that illustrated.

My invention is evidently not limited as regards the apparatus employed, the specific number of independent divisions in the source of electrical energy, or the arrangement of such divisions.

What I claim as my invention, and desire to secure by Letters Patent, is—

1. The method of operating electric motors from a divided source of electrical energy, which consists in dividing the field-circuit into independent divisions or units the number of which is proportional to that of the independent divisions in the source of electrical energy, supplying each field-circuit division from a corresponding division of the source of electrical energy, and supplying the armature or armatures from the combined divisions of the source of electrical energy.

2. The method of operating electric motors from a divided source of electrical energy, which consists in dividing the field-circuit into substantially equal independent divisions or units the number of which is proportional to that of the independent divisions in the source of electrical energy, supplying each field-circuit division from a corresponding division of the source of electrical energy, and supplying the armature or armatures from the combined divisions of the source of electrical energy.

3. The method of operating electric motors from a divided source of electrical energy which consists in dividing the field-circuit into independent divisions or units the number of which is equal to that of the independent divisions in the source of electrical energy, supplying each field-circuit division from a corresponding division of the source of electrical energy, and supplying the armature or armatures from the combined divisions of the source of electrical energy.

4. The method of operating electric motors from a divided source of electrical energy, which consists in dividing the field-circuit into substantially equal independent divisions or units the number of which is equal to that of the independent divisions in a source of electrical energy, supplying each field-circuit division from a corresponding division of the source of electrical energy, and supplying the armature or armatures from the combined divisions of the source of electrical energy.

5. The method of operating electric motors from a divided source of electrical energy, which consists in dividing the field-circuit into independent divisions or units the number of which is proportional to that of the independent divisions in the source of electrical energy, connecting each field-circuit division to a corresponding division of the source of electrical energy, subsequently connecting the armature or armatures to the combined divisions of the source of electrical energy, and maintaining such connections.

6. The method of operating electric motors from a divided source of electrical energy, which consists in dividing the field-circuit into independent divisions or units the number of which is proportional to that of the independent divisions in the source of electrical energy, supplying each field-circuit division from a corresponding division of the source of electrical energy, and supplying the armature or armatures from the several divisions of the source of electrical energy connected in multiple.

7. The method of operating electric motors from a divided source of electrical energy, which consists in dividing the field-circuit into independent divisions or units the number of which is proportional to that of the independent divisions in the source of electrical energy, supplying each field-circuit division from a corresponding division of the source of electrical energy, and supplying the armature or armatures from the several divisions of the source of electrical energy connected in series.

8. The method of operating electric motors from a divided source of electrical energy, which consists in dividing the field-circuit into independent divisions or units the number of which is proportional to that of the independent divisions in the source of electrical energy, supplying each field-circuit division from a corresponding division of the source of electrical energy and supplying the armature or armatures from the several divisions of the source of electrical energy connected in multiple series.

9. The method of operating an electric motor provided with a plurality of independent field-windings which consists in supplying said windings from corresponding independent sources of electrical energy, supplying the armature circuit or circuits from said sources of energy in combination and varying the electromotive force supplied to the armature circuit or circuits by changing the relation of said sources, whereby the speed of the motor is varied.

10. The method of operating an electric motor provided with a plurality of independent field-windings which consists in supplying said windings from corresponding independent sources of electrical energy, supplying the armature circuit or circuits from said sources of energy connected in multiple for a minimum rate of speed, connecting said sources in series multiple in one or more relations for one or more higher rates of speed and in series for a maximum rate of speed.

11. The method of operating a motor having a plurality of independent field-windings from a divided source of electrical energy which consists in first connecting the several field-circuits with corresponding divisions of the source of energy, then connecting the armature circuit or circuits with the divisions of the source of energy arranged in multiple, then grouping the said divisions in multiple series for one or more electromotive forces, and finally grouping said divisions in series, all without interrupting or changing the field-circuits.

12. The combination with an electric motor having a plurality of independent field-windings, of a divided source of electrical energy, each division of which supplies a corresponding field-circuit and means for connecting the combined divisions of the source of energy with the armature circuit or circuits and changing the relation of said divisions so as to vary the electromotive force supplied to the armature.

13. The combination with an electric motor having a plurality of independent field-windings, of a divided source of electrical energy each division of which supplies a corresponding field-winding, and a controller for grouping the several divisions of the source of energy in multiple, multiple series and series and for connecting the same to the armature circuit or circuits.

14. The combination with an electric motor having a plurality of independent field-windings, of a divided source of electrical energy, each division of which supplies a corresponding field-winding, and a controller constructed and operating to first close the several field-windings, then to connect the divisions of the source of electrical energy to the armature circuit or circuits in multiple, then to connect said divisions with the armature circuit or circuits in multiple series and finally to connect said divisions with the armature circuit or circuits in series.

15. The combination with a plurality of electric motors having a plurality of independent field-windings, of a divided source of electrical energy, means for connecting each of said field-windings to a corresponding division of the source of energy and means for connecting the armature-circuits to all of said divisions.

16. The combination with a plurality of electric motors each of which is provided with an independent field-winding, of a divided source of electrical energy, means for connecting each of said field-windings to a corresponding division of the source of energy and means for connecting the armature-circuits to all of said divisions.

In testimony whereof I have hereunto subscribed my name this 27th day of July, 1898.

CHARLES JOHN REED.

Witnesses:
JAMES W. LAWS,
ROBT. B. FLETCHER.